United States Patent [19]
Jonner et al.

[11] Patent Number: 4,962,970
[45] Date of Patent: Oct. 16, 1990

[54] ANTI-LOCK BRAKING SYSTEM

[75] Inventors: Wolf-Dieter Jonner, Beilstein-Schmidhausen; Volker Braschel, Heilbronn; Dieter Roller, Vaihingen.Enz; Herbert Demel, Möglingen, all of Fed. Rep. of Germany

[73] Assignee: Robert Bosch GmbH, Stuttgart, Fed. Rep. of Germany

[21] Appl. No.: 350,732

[22] Filed: Apr. 28, 1989

[30] Foreign Application Priority Data

Nov. 12, 1986 [DE] Fed. Rep. of Germany ....... 3638665

[51] Int. Cl.$^5$ .................... B60K 23/08; B60T 8/66; B60T 8/32
[52] U.S. Cl. ..................... 303/100; 180/233; 180/244; 180/249; 303/96
[58] Field of Search ............... 303/100, 96, 102, 103, 303/110, 111, 113, 119, 95, 109, 98, 105; 180/197, 233, 244, 245, 246, 248, 249, 250; 364/426.02, 426.01, 426.03, 424.1; 188/181 C

[56] References Cited

U.S. PATENT DOCUMENTS

| 4,675,819 | 6/1987 | Fennel | 303/105 X |
|---|---|---|---|
| 4,702,337 | 10/1987 | Burckhardt et al. | 303/110 X |
| 4,746,173 | 5/1988 | Fennel et al. | 180/248 X |
| 4,762,376 | 8/1988 | Matsubara | 180/233 X |
| 4,832,145 | 5/1989 | Fujii et al. | 180/233 |

FOREIGN PATENT DOCUMENTS

| 2706132 | 8/1978 | Fed. Rep. of Germany . |
| 3536185 | 4/1987 | Fed. Rep. of Germany . |
| 2151320 | 7/1985 | United Kingdom . |
| 2158903 | 11/1985 | United Kingdom . |

Primary Examiner—Douglas C. Butler
Attorney, Agent, or Firm—Felfe & Lynch

[57] ABSTRACT

An anti-lock braking system is specifically designed for a motor vehicle having four-wheel drive and a device for shifting between two-wheel and four-wheel drive incorporating a lockable central differential. Additional differentials at the front and rear axles may also be locked to avoid wheel spin. The anti-lock braking system produces a brake pressure reduction signal when the wheel speed falls below a reference value. In accordance with the invention the reference value is varied in dependence upon whether the vehicle is shifted into two-wheel or four-wheel drive, in dependence upon the engagement of the central differential lock, and/or in dependence upon the engagement of the other differential lock(s).

6 Claims, 3 Drawing Sheets

ANTI-LOCK BRAKING SYSTEM

BACKGROUND OF THE INVENTION

Motor vehicles are known which can be shifted from rear-wheel drive to four-wheel drive, for example, and in which the drives of the two axles can be rigidly coupled to each other by locking the associated differential. In addition, one or two differential locks may be provided for the rigid coupling of the wheel drives of one axle.

Moreover, anti-lock braking systems for motor vehicles are known which, for the control of the wheel slip, form a reference value whose curve optimally approximates that of the vehicle speed. In such system this reference value is formed by the use of different gradients.

The formation of the reference value is particularly difficult in the case of vehicles with four-wheel drive, and especially when, in addition, a central lock is engaged.

SUMMARY OF THE INVENTION

The principal object of the invention and its embodiments is to provide possible solutions for the problem outlined above. In this connection, it is important that the central lock and any further locks which may be used, as well as the four-wheel drive, be disengaged or defeated as the brakes are applied. This may be done in response to the brake light switch signal.

This object, as well as other objects which will become apparent from the discussion that follows, are achieved, in accordance with the present invention, by varying the reference value in dependence upon whether the motor vehicle is shifted into two-wheel or four-wheel drive, in dependence upon the engagement of a central lock, and/or in dependence upon the engagement of a differential lock.

For a full understanding of the present invention, reference should now be made to the following detailed description of the preferred embodiments of the invention and to the accompanying drawings.

DESCRIPTION OF THE PREFERRED EMBODIMENTS

Figure 1:
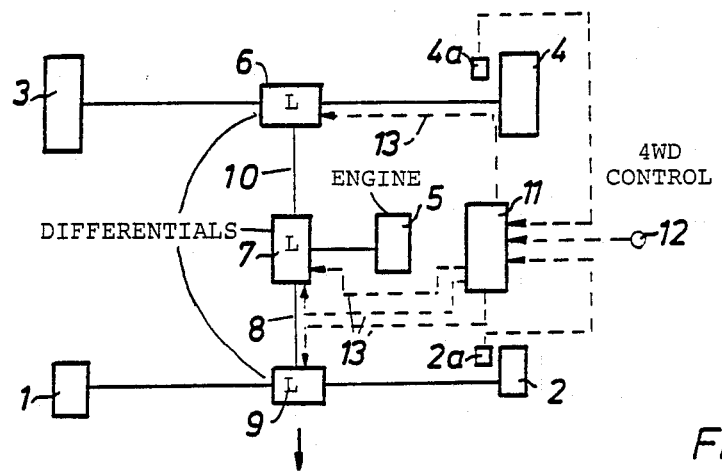
FIG. 1 is a block diagram of the power train and electronic control system for a four-wheel drive vehicle.
Figure 2:
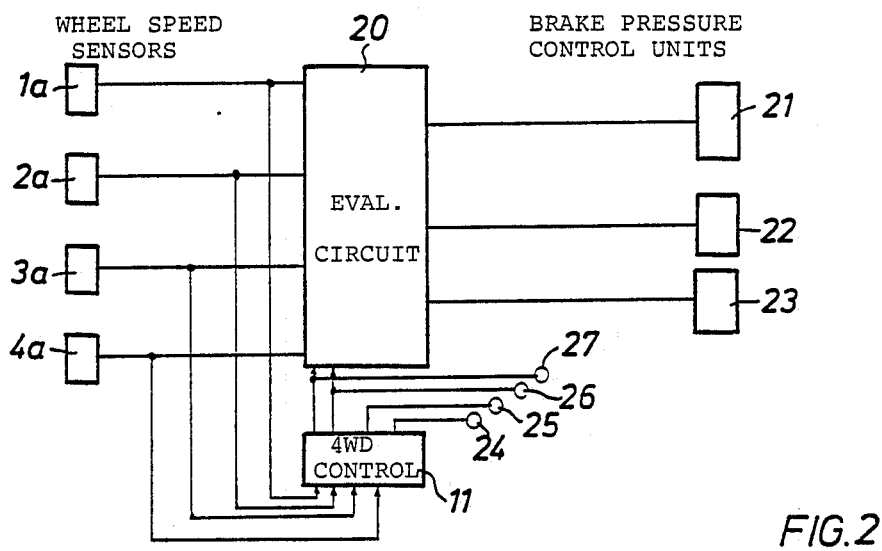
FIG. 2 is a block diagram of an anti-lock braking system according to the present invention, as applied to the vehicle of FIG. 1.
Figure 3:
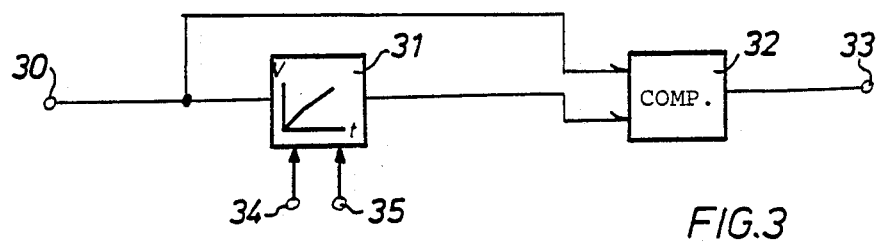
FIG. 3 is a block diagram showing a typical evaluation circuit which may be used in the system of FIG. 2.
Figure 4:
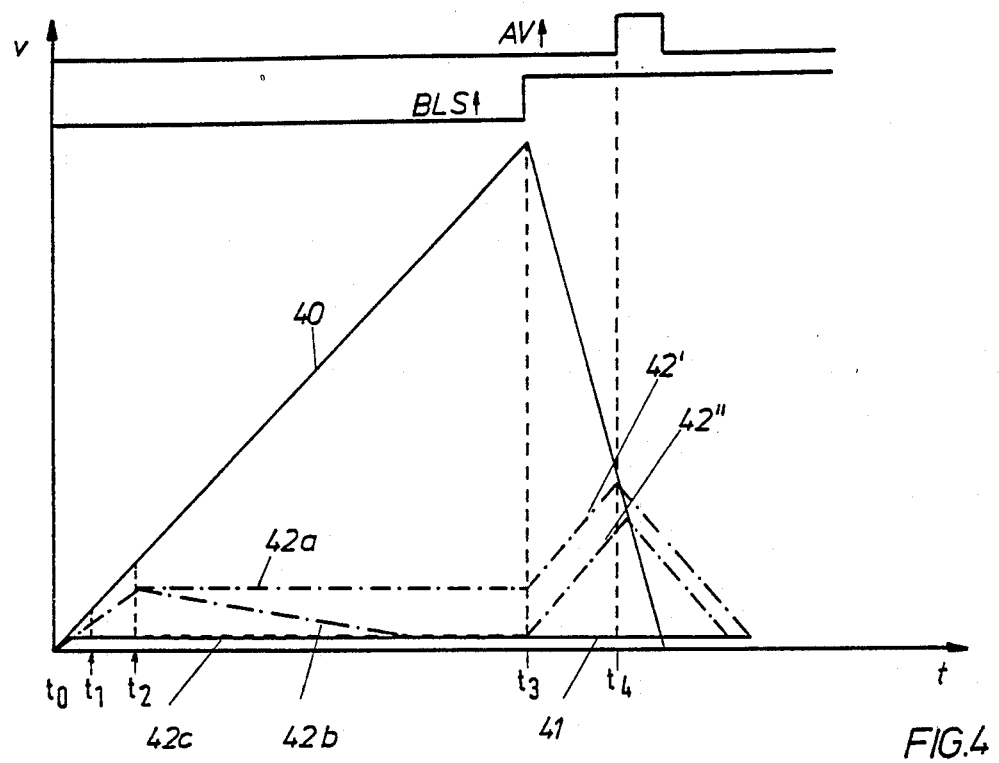
FIG. 4 is a time diagram illustrating the operation of the anti-lock braking system of FIGS. 2 and 3 in one driving situation.
Figure 5:
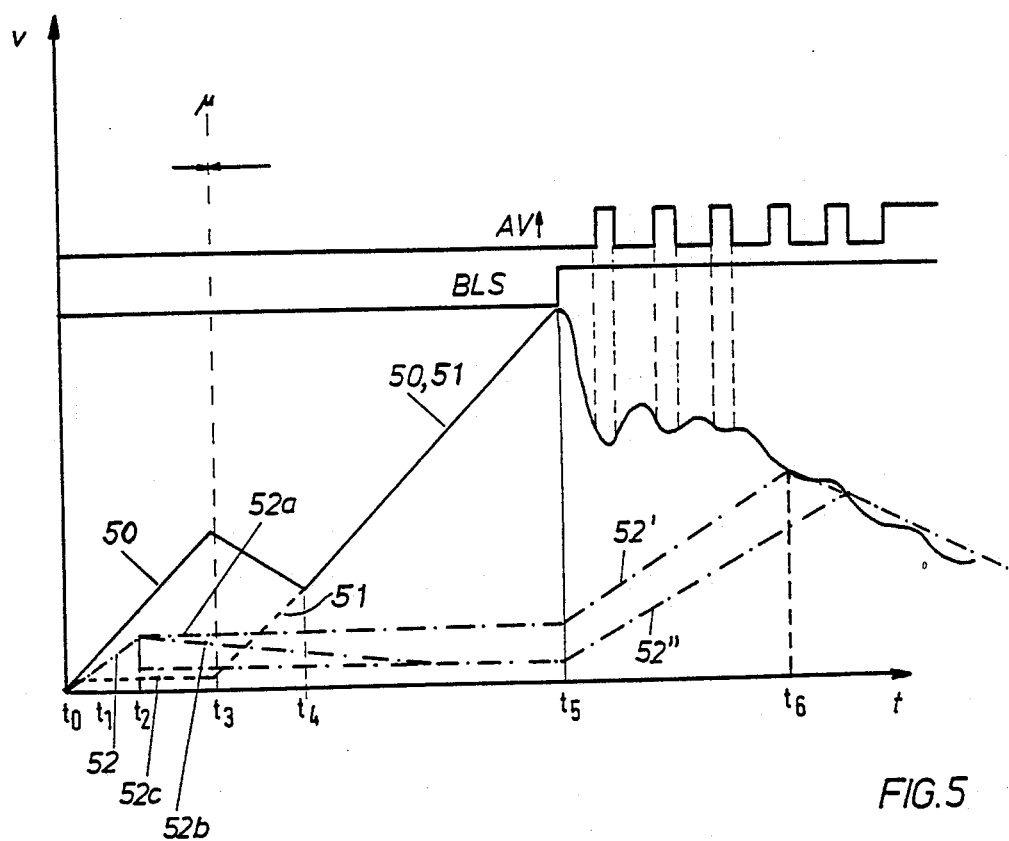
FIG. 5 is a time diagram illustrating the operation of the anti-lock braking system of FIGS. 2 and 3 in another driving situation.

An exemplary embodiment of the invention is illustrated in FIGS. 1 to 3, and various possible solutions are illustrated in FIGS. 4 and 5 in terms of two driving situations.

In FIG. 1, the front wheels of a motor vehicle are designated by 1 and 2, and its rear wheels by 3 and 4. An engine 5 is normally connected through a drive shaft 10 with a differential 6 through which the rear wheels 3 and 4 are driven.

In the vehicle shown in FIG. 1, provision is made for shifting to four-wheel drive, to which end a longitudinal differential 7 can be switched so that in addition to the shaft 10 for the rear-wheel drive a shaft 8 is driven, through which and through a further differential 9 the front wheels are driven.

The shafts 8 and 10 can be rigidly coupled to the engine through a central lock contained in the differential 7. The differentials 6 and 9 may also have differential locks that can be engaged.

The assumption is here made that the shifting to four-wheel drive and the engagement of the locks are brought about automatically by means of a control circuit 11 to which signals corresponding to the speeds of the wheels 1 to 4 are fed. (This is indicated in FIG. 1 only by the wheel speed sensors 2a and 4a for the wheels 2 and 4, respectively. Corresponding wheel speed sensors 1a and 3a are also connected to the control circuit 11.) On the basis of the wheel-speed differences ascertained, a shifting to four-wheel drive and/or an engaging of the differential locks occurs, triggered by means of lines 13. A brake light switch signal is fed to the terminal 12 for releasing the locks and disengaging the four-wheel drive.

Shown in FIG. 2 is the associated anti-lock braking system, consisting of the four wheel-speed sensors 1a to 4a, an evaluation circuit 20, brake-pressure control units 21 and 22 for the two front wheels 1 and 2, and a single brake-pressure control unit 23 for the rear wheels 3 and 4.

Also shown in FIG. 2 is the control circuit 11 from FIG. 1, to which the signals of the sensors 1a to 4a are fed, and which delivers the switching signals for the four-wheel drive and the differential locks by way of the terminals 24 to 27. The switching signals at the terminals 26 (for four-wheel drive shifting) and 27 (for the central lock) are also fed to the evaluation circuit to enter into the formation of the reference value.

FIG. 3 is a basic diagram showing the formation of slip in the evaluation circuit 20 of FIG. 2. The wheel-speed signal of one of the sensors 1a to 4a is fed to a terminal 30 and then to a reference-value former 31 and a comparator 32. Switching signals for the four-wheel drive (terminal 34) and for engagement of the central lock (terminal 35) are further fed to the reference-value former 31.

The reference value produced by the latter is compared in the comparator 32 with the wheel-signal, and a broke pressure-reduction signal is generated at a terminal 33 when the wheel-speed signal falls below the reference-speed signal.

The diagram of FIG. 4 illustrates the mode of operation of the reference-value former 31 of FIG. 3 for the driving situation in which the vehicle starts to climb a hill with the wheels spinning. Curve 40 shows the wheel speed, curve 41 the vehicle speed, and curves 42a, 42b and 42c different (alternative) reference values.

The driving situation starts at $t_0$. At $t_1$, shifting to four-wheel drive occurs automatically since the wheels are spinning (The vehicle speed 41 remains practically zero). This illustrates the case where the gradient of the reference speed 42 is limited and of the same magnitude (e.g., 0.2 grade) whether the four-wheel drive is engaged or not. Since the wheels continue to spin, the central lock is engaged at $t_2$. Now the reference value is either held constant (curve 42a) or then increased just slightly and continuously (not illustrated), reduced with a constant gradient (curve 42b), or set at a minimal speed (curve 42c; here approximately equal to the vehicle speed). This state persists until the brakes are applied at $t_3$ (see brake light switch signal BLS) and the wheel speed is consequently reduced. At $t_3$ the central lock is released and the four-wheel drive is also disengaged. The reference value now can rise with a given gradient of about 0.2 to 0.4 gr (course 42' in curve 42a; course 42" in curves 42b and 42c). At $t_4$, the wheel-speed signal (40) drops below the reference value (42'), and a brake pressure-reduction signal (AV) is now generated at the terminal 33. At the same time the reference value is reduced with a given negative gradient of about 0.3 to 0.4 gr.

The brake pressure reduction here brought about actually occurs only rarely or, when it does, only momentarily. This would not be the case if the reference value were allowed to rise further, as in the range from $t_o$ to $t_2$, which would result in a temporarily depressurized brake.

In the case of the reduction proposed according to curve 42b and 42", the advantage described in enhanced, and in the case of curve 42c and 42" it is even less likely that the brake pressure will be reduced. In the case of the last-mentioned curve, but also in the case of curve 42b with an appropriate negative gradient, the reference speed cannot exceed the vehicle speed even when the vehicle decelerates, with the central lock engaged.

The vehicle speed will not be appreciably exceeded by the reference speed even with the central lock momentarily released (for example, to check whether engaging the lock is still appropriate). In the case of curve 42b and 42", even spurious signals indicating an engaged central lock will not appreciably distort the reference.

In FIG. 4, the assumption is made that the gradient is the same with and without four-wheel drive. Actually, the reference value could be allowed to rise with a steeper gradient during the period from $t_o$ to $t_1$ (as is usually the case with ABS). However, there is then the risk that if the shifting to four-wheel drive is not recognized, the reference signal will increase too much and a long-lasting pressure-reduction phase will also result.

FIG. 5 is based on the assumption that the vehicle is about to climb a hill, with the wheels at first spinning but then reaching ground with a higher coefficient of friction ($\mu$). The wheel-speed curve is denoted by 50, and the reference-speed curve (or the corresponding signal curve) by 52 (with the different characteristics 52a to 52c and 52' and 52", respectively).

The vehicle is to start moving at $t_o$, but since the wheels are spinning the vehicle speed 51 remains practically zero. At $t_1$, shifting to four-wheel drive occurs; however, in this example also, the gradient of the reference speed is not changed. Only at time $t_2$, when the central lock is engaged, does one of the optional reference curves 52a or 42c of FIG. 4, provided as alternatives, become effective. At time $t_3$, the wheel reaches high-$\mu$ ground and is at first decelerated until the slip ceases (at $t_4$). Here the vehicle speed has caught up with the wheel speed, and both speeds increase in unison until the brake is applied at $t_5$ (BLS signal).

Between $t_2$ and $t_5$, the reference speed has taken a selected course according to the curves 52a to 52c. From $t_5$ onward, the reference speed increases according to curves 52',/52" with a given positive gradient (about 0.2 to 0.4 gr). At the same time, the four-wheel drive and the locks were here disengaged.

From $t_5$ onward, pressure-reduction signals AV are generated by the wheel-speed oscillations due to the deceleration until (at $t_6$) pressure-reduction signals are generated also by the slip.

In the case of FIG. 5, the curve 52a and 52", or the case of the slight increase in the reference, not shown here, is preferred since the reference catches up with the wheel speed sooner.

The increase in the reference after the application of the brakes is advantageous in the case of FIG. 5 but a drawback in the case of FIG. 4. As a compromise, a small gradient (e.g., 0.3 to 0.4 gr) is preferably selected.

There has thus been shown a novel anti-lock braking system which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

What is claimed is:

1. An anti-lock braking system for a motor vehicle that has four road wheels, means for braking each wheel, means for driving each wheel, and means for shifting between two-wheel and four-wheel drive, said shifting means incorporating a longitudinal differential between the front wheel drive shaft and the rear wheel drive shaft and a central lock for locking said longitudinal differential so as to drive said front and rear drive shafts at the same speed, said anti-lock braking system comprising:
    (a) at least one wheel speed sensor associated with one or more wheels for producing a signal representative of the respective wheel speed of said one or more wheel;
    (b) an evaluation circuit, responsive to the wheel speed signal of each wheel speed sensor, for producing a brake control signal for at least one wheel, said evaluation circuit including:
        (1) means, responsive to said shifting means, for producing a speed reference value which depends upon whether the central lock is engaged or disengaged, said reference value being reduced when the central lock is engaged; and
        (2) means, responsive to a wheel speed signal and to said reference value, for producing said brake control signal for at least one wheel in dependence upon the relative magnitudes of the represented wheel speed and said reference value; and
    (c) at least one brake pressure control unit, responsive to said brake control signal, for regulating the brake pressure applied to said at least one wheel.

2. The anti-lock braking system defined in claim 1, wherein said reference value is reduced with a constant negative gradient when said central lock is engaged.

3. The anti-lock braking system defined in claim 1, wherein said reference value is set to a constant value when said central lock is engaged.

4. The anti-lock braking system as in claim 3 wherein said reference value is set substantially equal to zero.

5. The anti-lock braking system defined in claim 1, wherein said brake control signal producing means includes means for differentiating said wheel speed signal to produce a wheel deceleration signal and means for comparing said deceleration signal with a second reference value, the brake pressure applied to said at least one wheel being reduced when deceleration signal exceeds said second reference value and, within a prescribed time thereafter, the wheel speed is reduced by a prescribed amount.

6. The anti-lock braking system defined in claim 5, wherein said pressure reduction is initiated even when said wheel speed exceeds said reference value.

* * * * *

UNITED STATES PATENT AND TRADEMARK OFFICE
CERTIFICATE OF CORRECTION

PATENT NO. : 4,962,970

DATED : October 16, 1990

INVENTOR(S) : Jonner et al.

It is certified that error appears in the above-identified patent and that said Letters Patent is hereby corrected as shown below:

Column 2, line 52, delete "broke" and insert -- brake --.

Column 4, line 8, delete "52"" and insert -- 52' --.

Signed and Sealed this

First Day of September, 1992

Attest:

DOUGLAS B. COMER

Attesting Officer

Acting Commissioner of Patents and Trademarks